(No Model.)

T. W. BRYANT.
ELECTRICAL BATTERY.

No. 368,806.                    Patented Aug. 23, 1887.

Witnesses
J. H. Shumway
Fred C. Earle

Thomas W. Bryant
Inventor
By Atty.

UNITED STATES PATENT OFFICE.

THOMAS W. BRYANT, OF ANSONIA, CONNECTICUT.

ELECTRICAL BATTERY.

SPECIFICATION forming part of Letters Patent No. 368,806, dated August 23, 1887.

Application filed April 18, 1887. Serial No. 235,151. (No model.)

*To all whom it may concern:*

Be it known that I, THOMAS W. BRYANT, of Ansonia, in the county of New Haven and State of Connecticut, have invented a new Improvement in Electrical Batteries; and I do hereby declare the following, when taken in connection with accompanying drawings and the letters of reference marked thereon, to be a full, clear, and exact description of the same, and which said drawings constitute part of this specification, and represent, in—

Figure 1:
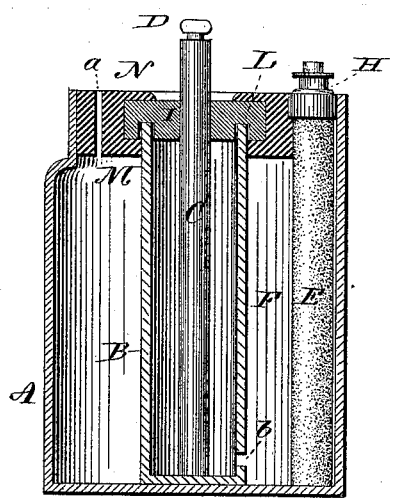
Figure 2:
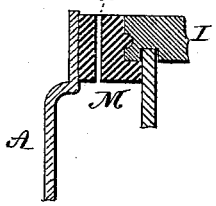
Figure 3:
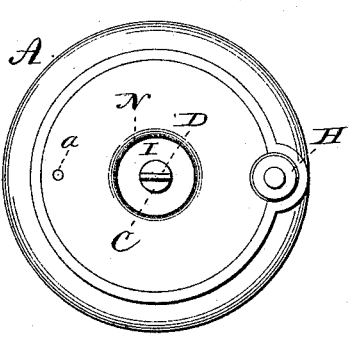

Figure 1, a vertical central section of the battery complete; Fig. 2, a modification in the cover; Fig. 3, a top view of the battery.

This invention relates to an improvement in batteries for electrical purposes, and is an improvement upon the battery commonly known as the "Leclanché" battery, and particularly to such as have a zinc arranged in the central porous cup, the object of the invention being to adapt the battery for use where its position is subject to constant change and the contents to corresponding agitation, such as upon railway-trains, other land conveyances, or on water conveyances, or wherever the battery is subject to change of position while in operation. By placing the zinc in the center the porous cup may be made of very small diameter compared with what it must be when the carbon is in the center.

In illustrating my invention, A represents the jar, which may be of the usual form. Centrally in the jar the porous cup B is arranged. It is of small diameter, as before mentioned—say about three-quarters of an inch, little more or less. This porous cup is adapted to receive the zinc C, which is fitted with the usual binding-post, D, at its upper end. Outside the porous cup, and within the jar, a stick of carbon, E, is arranged, supported in a vertical position, and the space F in the jar outside the porous cup is filled with granulated carbon and granulated black oxide of manganese in the usual proportions. The carbon is provided with the usual binding-post, H.

Upon the top of the porous cup a cover, I, is applied. This cover is made from a flexible material and possessing some degree of elasticity, such as india-rubber, or may be cork. It is of larger diameter than the cup, and preferably has a concentric groove, L, upon its under side to set over the edge of the cup.

Centrally through the cover I is an opening corresponding to and so as to receive the zinc C through it, and yet close tightly around the zinc, so that the zinc forms a complete stopper for the opening through the cover. After the carbon has been introduced and the cover I applied to tightly close the upper end of the porous cup, I apply a composition filling, M, to close the upper end of the jar, and this filling laps onto the cover I of the porous cup, as shown at N, and so that the filling adhering firmly to the jar it is secured in place, and, lapping onto the cover I, secures the cover to the jar. Through the filling I leave or form a very small aperture, *a*, into the jar outside the porous cup, so that when the carbon is in place the whole top of the jar and cup is sealed, except as to the small aperture *a*. In the bottom of the porous cup are one or more apertures, *b*, opening into the surrounding jar.

To supply the jar with solution, withdraw the zinc C from the cover, which is done without affecting the cover, as that is securely held by the surrounding composition. Then pour the solution through the opening in the cover into the porous jar, whence it escapes rapidly through the apertures at the bottom of the porous cup and flows into the jar, the air, gas, or whatever it may be in the jar escaping through the small aperture *a* as the solution fills the jar. When properly filled, set the zinc through the opening in the cover to its place in the porous cup. The zinc fits the opening in the elastic or flexible cover so tightly that there can be no escape around the zinc, and the battery is ready for use.

The aperture *a* being the only aperture into the jar, it being otherwise hermetically sealed, it is impossible for the solution to escape through that aperture; hence even if the battery be inverted the solution cannot escape, and no matter what the agitation of the battery or its position the contents of the battery remain intact and cannot escape.

I make an aperture (one or more) through the porous cup into the jar, in order to permit the solution to be quickly applied and avoid slow filtration through the porous cup, which would be necessary were there no apertures. The apertures through the porous cup into the jar may therefore be omitted.

I prefer to make the engagement between the cover I and the composition covering outside by overlapping, as I have described; but it is immaterial to the invention how the engagement be made, it only being essential that there shall be such an engagement between the cover I and the surrounding composition closing the jar that the cover will thereby be firmly held to its place to close the porous cup. As an illustration of other engagement, see Fig. 2, in which the edge of the cover has an annular recess, into which the composition will extend, and so that when set it will secure the cover.

The elastic or flexible cover may set into the cup with sufficient friction to hold it in its place without positive interlocking with the composition which closes the surrounding portion of the jar; but in such case the cover must have so far closed the joint as to hermetically seal the upper end of the cup, for should there be an opening through the cup for the purpose of ventilation, as has been sometimes employed, it forms a passage through which the contents may escape when the jar is upset or turned to any considerable extent out of its vertical position, so that there must be a perfect sealing between the cover, the cup, and the zinc, and also a complete sealing of the surrounding jar, except as to the single opening in the surrounding composition sealing, sufficient to permit the escape of air when the jar is filled through the porous cup.

I claim—

1. The herein-described battery, consisting of the jar A, porous cup B, concentrically arranged in the said jar, the said porous cup having apertures opening into the surrounding jar, the elastic or flexible cover I, adapted to close the upper end of the porous cup, said cover having an opening through it, a zinc extending through the opening in the said cover into said porous cup and closely filling the said opening in the cover as a stopper, combined with the carbon E, set in the jar outside said porous cup, the upper end of the said jar around the porous cup and carbon closed with a composition, except as to a small aperture, a, through said composition into the jar outside the cup.

2. The herein-described battery, consisting of the jar A, porous cup B, concentrically arranged in said jar, the elastic or flexible cover I, adapted to close the upper end of the porous cup, said cover having a single opening through it, a zinc extending through said opening in the cover into said porous cup and closely filling the said opening in the cover as a stopper, combined with the carbon E, set in the jar outside said porous cup, the upper end of the jar around the porous cup and carbon closed with a composition which engages the cover of the porous cup, and so as to secure the said cover to the cup, the composition having a small aperture, a, through it into the jar outside the cup, all substantially as described.

THOS. W. BRYANT.

Witnesses:
F. L. GAYLORD,
W. C. BARCLAY.